United States Patent

Shin

[11] Patent Number: 6,134,556
[45] Date of Patent: Oct. 17, 2000

[54] METHOD FOR SEARCHING A TRIANGLE CORRESPONDING TO A LOCATION OF AN OBJECT MOVING ON TRIGONOMETRIC GRIDS

[75] Inventor: Kwang-Sung Shin, Seoul, Rep. of Korea

[73] Assignee: Daewoo Electronics Co., Ltd., Seoul, Rep. of Korea

[21] Appl. No.: 09/109,850

[22] Filed: Jul. 2, 1998

[30] Foreign Application Priority Data

Nov. 21, 1997 [KR] Rep. of Korea ............... 97-61956

[51] Int. Cl.[7] ................................................ G06F 17/30
[52] U.S. Cl. ...................................... 707/102; 3/200
[58] Field of Search .................... 707/2, 3, 101, 707/102, 200

[56] References Cited

U.S. PATENT DOCUMENTS

| | | | |
|---|---|---|---|
| 4,952,922 | 8/1990 | Griffin et al. | 395/121 |
| 5,355,442 | 10/1994 | Paglieroni et al. | 395/127 |
| 5,428,726 | 6/1995 | Piegl et al. | 395/141 |
| 5,684,538 | 11/1997 | Nakaya et al. | 348/416 |
| 5,850,341 | 12/1998 | Fournier et al. | 37/347 |
| 5,978,030 | 11/1999 | Jung et al. | 348/416 |

FOREIGN PATENT DOCUMENTS

| | | |
|---|---|---|
| 406231276 | 8/1994 | Japan . |
| 2100100 | 12/1982 | United Kingdom . |
| 2104759 | 3/1983 | United Kingdom . |
| 2331685 | 7/1998 | United Kingdom . |

*Primary Examiner*—Jean R. Homere
*Attorney, Agent, or Firm*—Anderson Kill & Olick, P.C.

[57] ABSTRACT

A method for searching a triangle on which an object lies while the object moves on a trigonometric grid, wherein the triangle is one of the constituents of the trigonometric grid approximately representing a terrain, is provided. For the search, first, the inventive method retrieves information on a present triangle and predicts a next location after a predetermined time interval from the present time. Then, a nearest vertex is found, the nearest vertex referring to a vertex of the present triangle being nearest to a present location of the object and candidate triangles sharing the nearest vertex are selected. Finally, it is determined whether or not the next location lies on each candidate triangle.

5 Claims, 4 Drawing Sheets

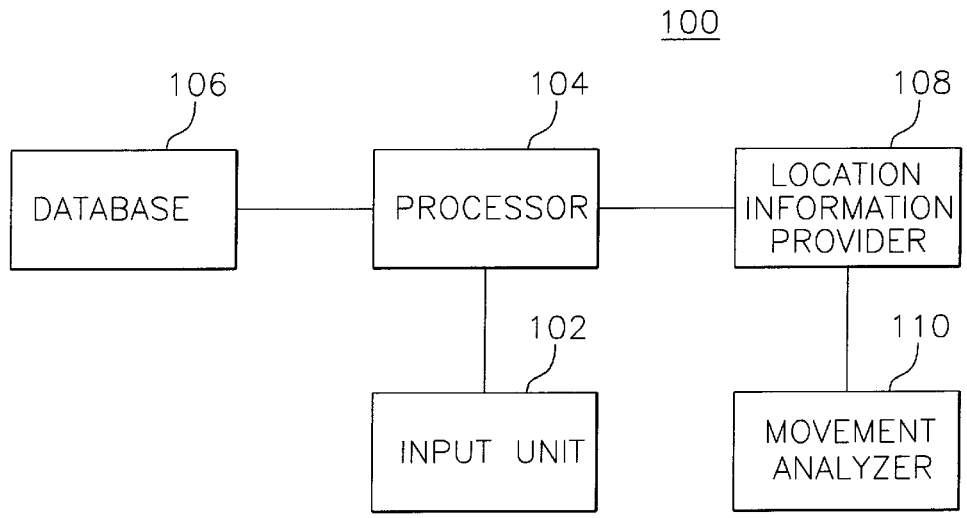

METHOD FOR SEARCHING A TRIANGLE CORRESPONDING TO A LOCATION OF AN OBJECT MOVING ON TRIGONOMETRIC GRIDS

FIELD OF THE INVENTION

The present invention relates to a terrain tracer simulator; and, more particularly, to a method for searching a triangle on which an object lies while the object travels on the surface of a trigonometric grid.

GROUND OF THE INVENTION

A good example of the application of a terrain tracer simulator technology is a vehicle driving simulation video game. In such a video game, a terrain tracer simulator is designed to provide a mock view of a path along which the vehicle is driven as well as the scenery surrounding the path.

Information on the path and on the scenery is converted into proper data to be stored in the terrain tracer simulator prior to the operation thereof. A technique approximately representing a contour of the scenery by using a polygonal grid is used in reconstructing the image of the path and the scenery. The polygonal grid is a network of a plurality of small planar polygonal patches, e.g., triangles. In order to instantly and continuously display the path and the scenery with the movement of the vehicle, it is necessary to predict information at a next location of the vehicle at a predetermined time interval ahead from a present time based on the present speed and the direction of the vehicle. Further, based on the prediction, the terrain tracer simulator is required to perform a selection process, deciding which polygon of the polynomial grid the next location of the vehicle will lie on.

For the terrain tracer simulator to provide a display of the fast-moving path and the scenery, the prediction and the selection process must be iterated in a very short time interval. On the other hand, the prediction and the selection process involve a large volume of calculation. Therefore, a faster prediction and a faster selection process are strongly desired for the execution of a large volume of calculation within a limited time on order to reduce the time needed for the prediction and the selection process.

SUMMARY OF THE INVENTION

It is, therefore, a primary object of the present invention to provide a method for searching a triangle on which an object lies while the object travels on the surface of the trigonometric grid.

In accordance with the present invention, there is provided a method for searching a triangle on which an object lies while the object moves on a trigonometric grid, wherein the triangle is one of the constituents of the trigonometric grid approximately representing a terrain, the method comprising the steps of: (a) retrieving information on a present triangle, the present triangle referring to a triangle on which the object lies at a present time; (b) predicting a next location after a predetermined time interval from the present time; (c) finding a nearest vertex, the nearest vertex referring to a vertex of the present triangle being nearest to a present location of the object; (d) selecting candidate triangles sharing the nearest vertex; and (e) deciding whether or not the next location lies on said each candidate triangle.

BRIEF DESCRIPTION OF THE DRAWINGS

The above and other objects and features of the present invention will become apparent from the following description of preferred embodiments given with reference to the accompanying drawings, in which:

FIG. 1 depicts a block diagram of a terrain tracer simulator capable of executing the inventive method;

FIGS. 2A and 2B show exemplary formats of data stored in a database.

FIGS. 4A and 4B present a flow diagram describing the inventive method for deciding which triangle the object lies on.

DETAILED DESCRIPTION OF THE PREFERRED EMBODIMENT

Figure 3:
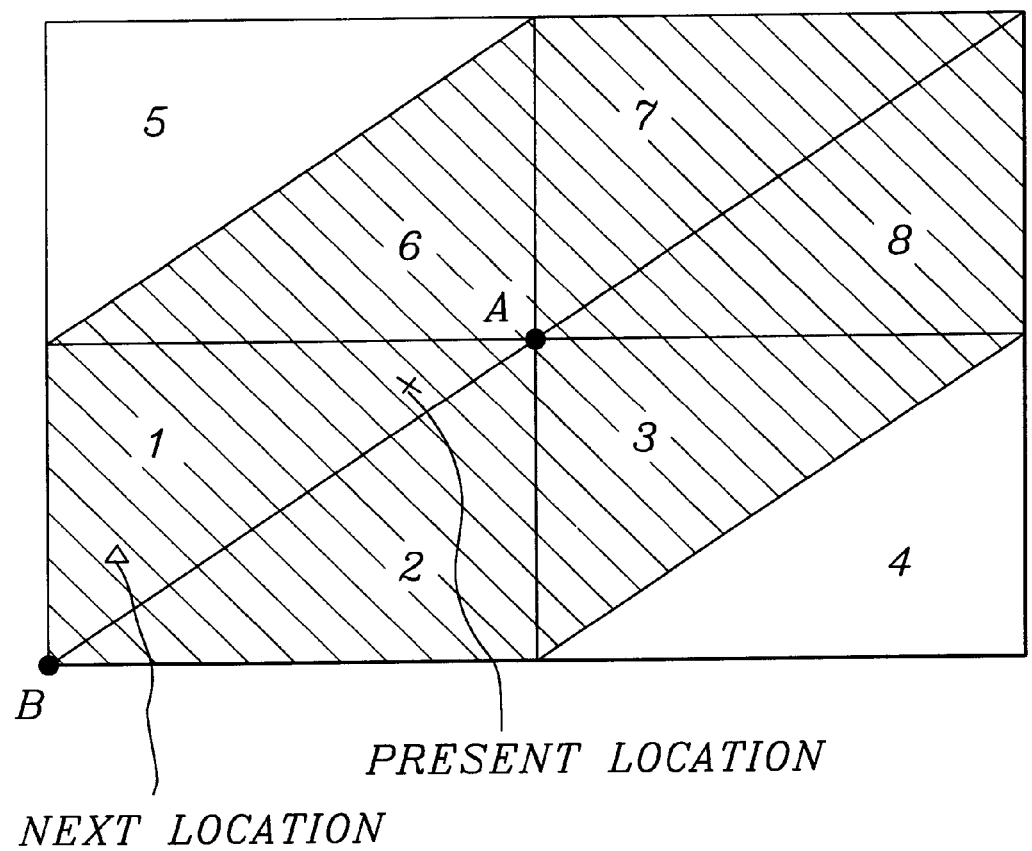
FIG. 3 illustrates a relationship between locations of an object and candidate triangles.

A preferred embodiment in accordance with the present invention will now be described in detail with reference to FIGS. 1 to 4B.

FIG. 1 depicts a block diagram of a terrain tracer simulator 100 capable of executing the inventive method for deciding which triangle the object lies on.

The terrain tracer simulator 100 in accordance with the present invention comprises an input unit 102, a processor 104, a database 106, a location information provider 108, and a movement analyzer 110.

The input unit 102 serves to receive inputs from an operator or a driver, wherein the input may be a selection signal as to a terrain the user wants to follow or a starting position of an object or a vehicle (not shown) traveling on the terrain. The starting position can be given a default location in the absence of the input when starting the terrain tracer simulator 100.

The processor 104 controls overall operation involved in the method in accordance with the present invention, i.e., the method for deciding whether or not the vehicle lies on a triangle on a terrain surface being represented by a trigonometric grid. For example, it receives an instruction of the operator from the input unit 102, retrieves data representing the terrain surface, performs a prediction process, i.e., obtaining information on a next location of the vehicle at the time of some predetermined time interval ahead from a present time, and also performs a selection process of deciding which triangle of the trigonometric grid the next location of the vehicle will lie on, wherein the next location refers to a location of the vehicle at the time of a predetermined time interval ahead from a present time; and a present location corresponds to the present time.

The database 106 serves for storing data representing the terrain surface. The contour of the terrain is reconstructed by using a plurality of small triangles, and, therefore, the database 106 stores information on the triangles. Exemplary formats of data stored in the database 106 is shown in FIGS. 2A and 2B. As shown in FIG. 2A, the database 106 holds a vertex list, i.e., information on vertices employed in the trigonometric grid, and each vertex represents a value on each axis of a three dimensional coordinate system, i.e., X, Y and Z. FIG. 2B holds a triangle list, i.e., information on triangles, each of the triangle is represented by three vertices composing each triangle. For example, as shown in FIG. 2B, numbers 1, 7 and 10 represent 3 vertices of triangle 1.

Before performing the decision process in accordance with the present invention, it is assumed that information on the reconstructed terrain is previously stored in the database 106. The information is represented by the vertex list and the triangle list as shown in FIGS. 2A and 2B.

The location information provider 108 predicts the next location of the vehicle after the predetermined time interval from the present time which corresponds to the present location and provides the processor 104 with the information on the next location.

The movement analyzer 110 monitors the movement of the vehicle to obtain data on the speed and the direction of the vehicle and provides the data on the speed and the direction to the location information provider 108.

Figure 4A:
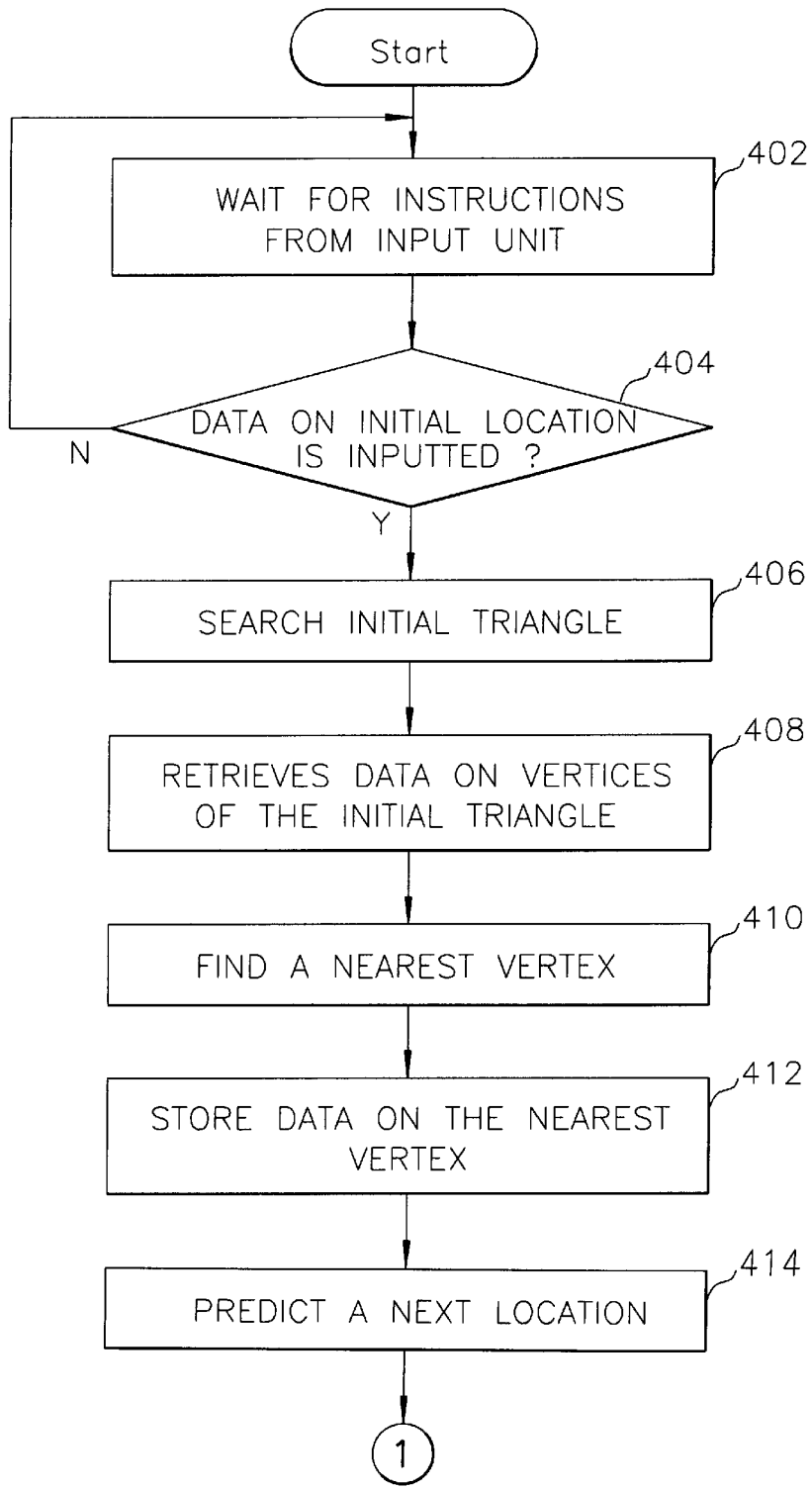
Figure 4B:
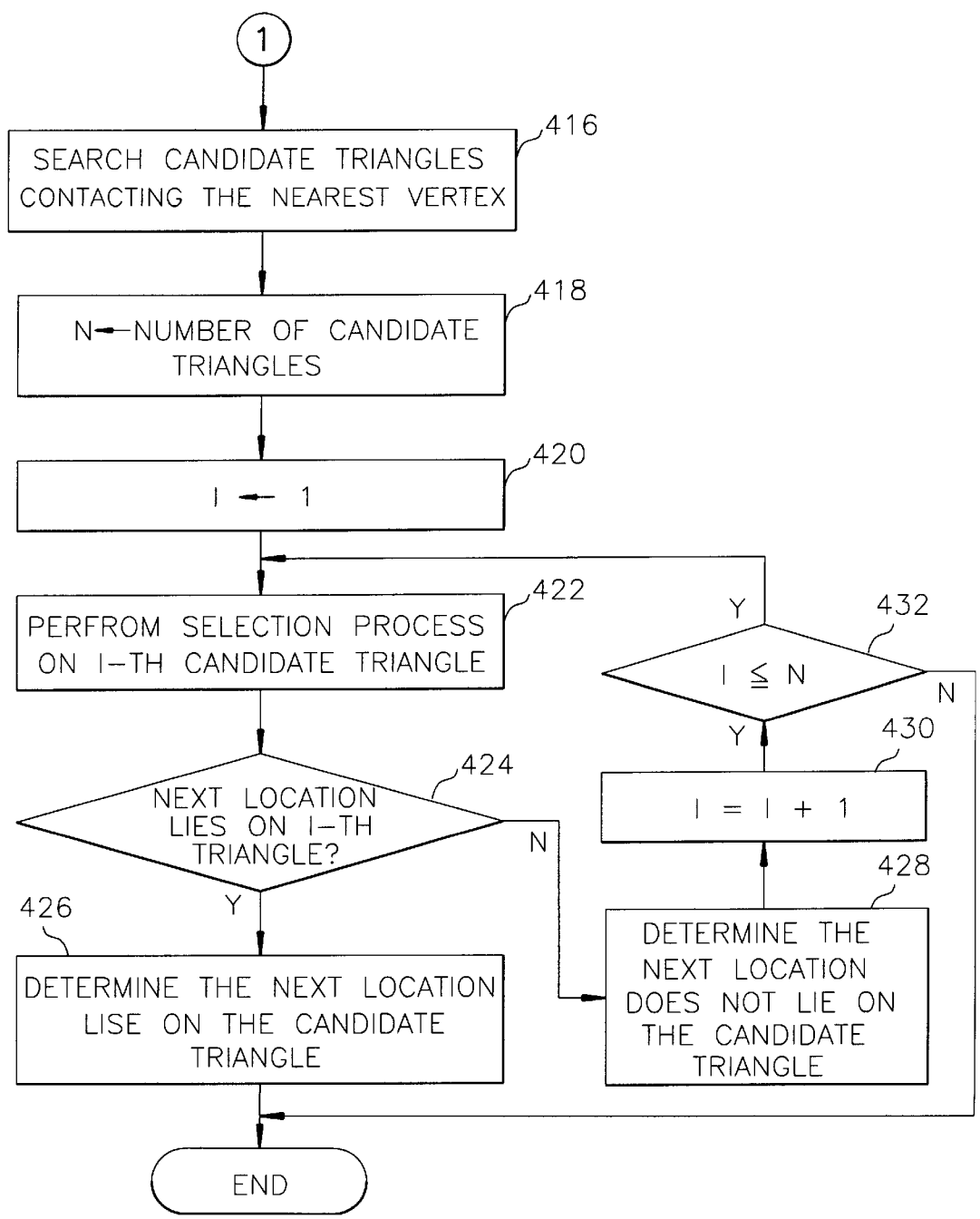

FIG. 3 illustrates a relationship between locations of an object and candidate triangles. FIGS. 4A and 4B present a flow diagram describing the inventive method for searching which triangle the object lies on.

The method in accordance with the present invention will now be described by reference to FIGS. 1 to 4B.

At step 402, the processor 104 in the terrain tracer simulator 100 waits for an instruction providing an initial location of the vehicle. In this preferred embodiment, it is assumed that the initial location of the vehicle is marked with "x" in FIG. 3.

At step 404, it is checked if the instruction providing the initial location of the vehicle is transmitted from the input unit 102. If it is determined that the instruction has not been transmitted, the processor 104 idles to await the instruction at step 402. On the contrary, if it is determined that the instruction has been transmitted, the processor 104 searches an initial triangle on which the initial location lies at step 406. The initial triangle is a triangle assigned number 1 which contains the initial location in FIG. 3.

At step 408, the processor 104 retrieves data on vertices constituting the initial triangles. Referring to FIG. 2B, the data on the vertices constituting the initial triangle is 1, 7 and 10, which identify the vertices that constitute the initial triangle. Each vertex that constitutes the initial triangle has its own coordinate values as shown in FIG. 2A. Consequently, the data retrieved by the processor 104 at step 408 is vertex numbers, e.g., 1, 7, 10 and coordinate values corresponding the vertex numbers, e.g., $X_1, Y_1, Z_1; X_7, Y_7, Z_7; X_{10}, Y_{10}, Z_{10}$.

Then, at step 410, the processor 104 selects a nearest vertex which is nearest to the initial location of the vehicle by comparing the distance between the initial location and each vertex. In the case of the preferred embodiment, it is assumed that the nearest vertex is a vertex marked with "A" in FIG. 3. Data on the nearest vertex, i.e., coordinate values thereof, is stored in the processor 104 at step 412.

At step 414, the prediction process is performed to obtain information on the next location of the vehicle at the time of some predetermined time interval ahead from the present time. The prediction can be achieved by calculating a present speed and a present direction of the vehicle. In this preferred embodiment, it is assumed that the next location of the vehicle is identified as a spot marked with symbol "Δ" as shown in FIG. 3.

At step 416, candidate triangles are selected by the processor 104, wherein the candidate triangles are triangles sharing the nearest vertex. In this preferred embodiment, the candidate triangles are identified as numbers 1 to 3 and 6 to 8, respectively, as shown in FIG. 3.

The processor 104 assigns the number of the candidate triangles to variable N at step 418, and, also assigns one to counter i at step 420, wherein counter i is a parameter for use in representing an order of the candidate triangles that will undergo the selection process.

At step 422, the processor 104 performs the selection process to decide whether the next location of the vehicle lies on a first candidate triangle. Herein, it is assumed that the sequence of the selection process with respect to each candidate triangle is determined by the number assigned to each candidate triangle. Therefore, the sequence is 1, 2, 3, 6, 7 and 8 in this preferred embodiment and the first candidate triangle corresponds to triangle 1 in FIG. 3.

Accordingly, at step 424, it is checked whether the next location of the vehicle lies on the first candidate triangle. If the next location of the vehicle is determined to lie on the candidate triangle, the procedure proceeds to step 426 where it is determined that the next location lies on the first candidate triangle and the procedure ends. Since the next location "Δ" lies on the first candidate triangle, the procedure ends. But, on the other hand, if the next location of the vehicle is determined not to lie on the candidate triangle at step 424, the procedure proceeds to step 428 wherein it is determined that the next location does not lie on the first candidate triangle.

If the next location of the vehicle is determined not to lie on the candidate triangle 1, the procedure proceeds to step 430 wherein counter i is increased by one, then, the procedure proceeds to step 432. At step 432, it is checked whether counter i is smaller than or equal to variable N i.e., the number of the candidate triangles. If the answer is in the affirmative, the procedure returns to step 422, wherein the selection process is performed with respect to candidate triangle 2. Steps 422, 424, 428, 430 and 432 may be repeated with respect to candidate triangles 3, 6, 7, and 8 until it is determined that the next location lies on one of the candidate triangles. If the answer is in the negative at step 432, which implies that the selection process fails to find any candidate triangle that contains the next location, the procedure ends.

In description of the preferred embodiment in the above, it has been assumed that the next location cannot pass more than one boundary of triangles from the present location since the predetermined time interval between every selection process is chosen short enough and the magnitude of the triangle is chosen large enough to ensure it. Therefore, the terrain tracer simulator 100 is designed so that the next location lies on any one of the candidate triangle.

This assumption may not be necessary if the range of the candidate triangles is chosen wider than that of the preferred embodiment, which, however, requires much more time due to a larger volume of calculation. Therefore, alternatively, even though the range of the candidate triangles is the same as that of the preferred embodiment, a step of determining error may be inserted if the answer is in the negative at step 432 before ending the procedure.

As described in the above, the method in accordance with the present invention is capable of fast and effectively finding a triangle on which the next location lies.

While the present invention has been described with respect to the preferred embodiments, other modifications and variations may be made without departing from the scope and spirit of the present invention as set forth in the following claims.

What is claimed is:

1. A method for searching a triangle on which an object lies while the object moves on a trigonometric grid, wherein the triangle is one of the constituents of the trigonometric grid approximately representing a terrain, the method comprising the steps of:

(a) retrieving information on a present triangle, the present triangle referring to a triangle on which the object lies at a present time;

(b) predicting a next location after a predetermined time interval from the present time;

(c) finding a nearest vertex, the nearest vertex referring to a vertex of the present triangle being nearest to a present location of the object;

(d) selecting candidate triangles sharing the nearest vertex; and (e) deciding whether or not the next location lies on said each candidate triangle.

2. The method of claim 1, wherein the deciding at step (e) is no longer performed if a triangle on which the next location of the object lies is found.

3. The method of claim 2, wherein step (e) includes the steps of:

(e1) assigning number N to the number of the candidate triangles and 1 to an initial value of counter i;

(e2) checking if the next location of the vehicle lies on the i-th candidate triangle;

(e3) ending the procedure if the next location is determined to lie on the i-th triangle;

(e4) increasing the value of counter i by 1 if the next location is not determined to lie on the i-th triangle;

(e5) checking if the value of counter i is smaller than or equal to number N;

(e6) going back to step (e3) if the value of counter i is determined to be smaller than or equal to number N; and (e7) ending the procedure if the value of counter i is determined to be larger than number N.

4. The method of claim 3, wherein the present triangle is identified by three vertices thereof.

5. The method of claim 4, wherein the vertices of the present triangle is expressed with values on each coordinate in three dimensional coordinate system.

* * * * *